Feb. 3, 1953 W. L. WEAKLEND 2,627,157
GRASS DEFLECTOR FOR MOWERS
Filed March 17, 1951 2 SHEETS—SHEET 1
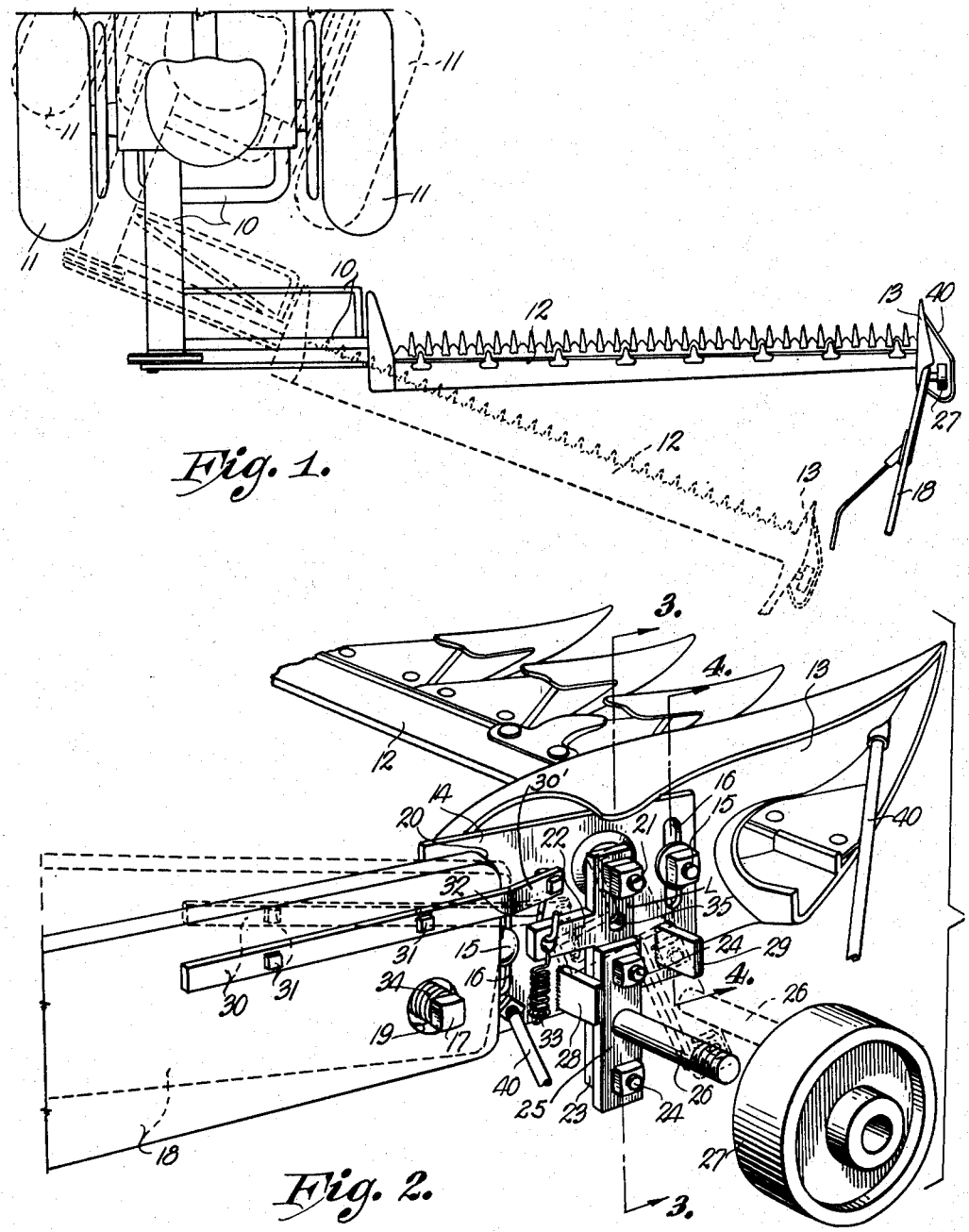
INVENTOR.
Walter L. Weaklend
BY
Thos. E. Scofield
ATTORNEY.

Feb. 3, 1953 — W. L. WEAKLEND — 2,627,157
GRASS DEFLECTOR FOR MOWERS
Filed March 17, 1951 — 2 SHEETS—SHEET 2
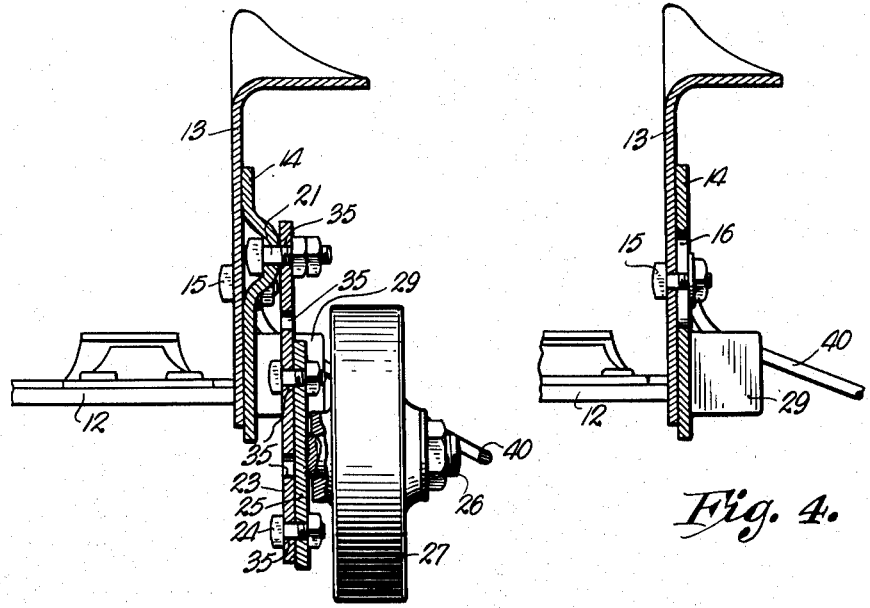
Fig. 3.
Fig. 4.
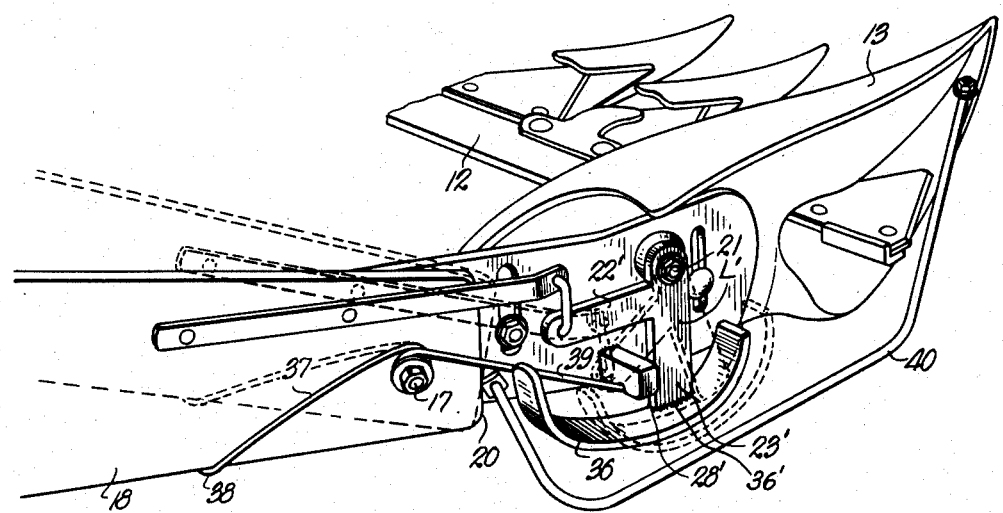
Fig. 5.
INVENTOR.
Walter L. Weaklend
BY
ATTORNEY.

Patented Feb. 3, 1953

2,627,157

UNITED STATES PATENT OFFICE 2,627,157

GRASS DEFLECTOR FOR MOWERS

Walter L. Weaklend, Platte City, Mo., assignor to Rockledge Manufacturing Company, a corporation of Missouri Application March 17, 1951, Serial No. 216,114

15 Claims. (Cl. 56—314)

This invention relates to grass deflector boards for mowers, and more particularly to mechanism for raising and lowering the boards when carried in place on a mower.

Grass deflector boards are well known. They are used on mowing machines to deflect inwardly the falling cut grass at the end of the swath, leaving the edge of the swath clear to assist the operator in guiding the mower when he cuts the next adjacent course. The deflector board is attached to the end of the cutter bar of the mower. Some boards are mounted to yield resiliently vertically and laterally so as to be able to pass over or by obstructions. However, this does not take care of the trouble that arises when the machine reaches the end of a course and is turned to cut the next course. To turn the mower the operator usually locks the tractor wheel nearest the mower and advances the opposite tractor wheel, a maneuver which causes the end of the cutter bar to move rearwardly and drag the deflector board backwardly over the ground. This imposes strain and stress on the board for which it is not designed, with the result that deflector boards are apt to, and often do, become broken when the mowing machine is being turned.

To protect the deflector board against being broken or unduly strained when the machine is turning, it has been proposed in the past to provide arrangements for lifting the deflector board manually during the time it moves rearwardly at turns, but these are generally unsatisfactory because they are cumbersome, awkward, expensive, and require considerable dexterity on the part of the operator who must synchronize the manual lifting of the board with the other control operations he performs in the course of maneuvering the mower through turns.

A principal object of my invention is to so mount a deflector board on the end of a cutter bar of a mowing machine that the board will lift and stay lifted automatically when and while the board moves rearwardly over the ground and lowers to normal height above the ground automatically when the board is moved forwardly again; and another object of this invention is to provide simple, sturdy and durable mechanism, which is positive and reliable in operation and whereby the above object of my invention is attained.

Another object of this invention is to provide means for automatically raising and lowering a deflector board on a cutter bar, in response to backward and forward movement respectively of the board relatively to the ground, and which means permit the operating height of the deflector board above the ground to be varied as needed to meet different ground or grass conditions.

A further object of this invention is to provide automatically operating deflector board raising and lowering mechanism of the character stated and which is so organized and positioned that the mechanism is not apt to become clogged with grass during the cutting.

Other objects of this invention will be in part obvious and in part pointed out hereinafter.

In accordance with this invention the deflector board is pivotally carried on the cutter bar of the mower or on the cutter bar shoe, the pivot being a short distance from the leading end of the board. There is also a ground engaging member which drags on the ground. This member is suspended from the cutter bar of this mower or the cutter bar shoe and is movable forwardly and rearwardly relatively to the deflector board in accordance with the direction of the drag exerted on the drag member by the ground when the drag member is moved thereover. Mechanism connects the drag member to the deflector board in such a way that when the drag member is in its backward position relatively to the board, the board is in its normal lowered operating position and when the drag member moves to its forward position relatively to the board, the board will be raised automatically and will stay raised so long as the drag member stays in such relatively forward position.

The invention accordingly consists in the features of construction, combinations of elements, and arrangements of parts which will be more fully described hereinafter, and the scope of the application of which will be set forth in the claims that follow.

In order that a clearer understanding of this invention may be had, attention is hereby directed to the accompanying drawings, forming a part of this application, and illustrating certain possible embodiments of this invention, and in which:

Fig. 1 is a plan view of a portion of a mowing machine having a cutter bar and a grass deflecting board thereon; and indicating by dash lines the manner in which the parts move relatively to the ground when the machine is being turned to the right;

Fig. 2 is an enlarged perspective view of a detail of the above and shows a fragment of the deflecting board and the board elevating and lowering mechanism mounted on the shoe of the mower;

Fig. 3 is a sectional view of the same taken along the line 3—3 of Fig. 2 in the direction of the arrows;

Fig. 4 is a sectional view taken along the line 4—4 of Fig. 2; and

Fig. 5 is a view similar to Fig. 2 but illustrates a somewhat modified construction.

Similar reference characters refer to similar parts throughout the several views of the drawings.

Referring to the drawings, in Fig. 1 there is shown somewhat diagrammatically a portion of a mowing machine including part of a tractor chassis, indicated generally by the reference numeral 10, tractor wheels 11, a cutter bar 12 carried by the chassis and a shoe 13 carried on the end of the cutter bar 12.

In the embodiment shown, there is a mounting plate 14 which is bolted to the shoe 13 by two bolts 15 which pass through vertically elongated openings or slots 16 in the shoe 13, permitting vertical adjustment of the mounting plate on the shoe for a purpose that will be mentioned hereinafter.

Pivoted on a bolt or stud 17 which is carried on mounting plate 14 is the grass deflector board 18, the bolt 17 passing through a pivot aperture 19 therefor in the board a short distance rearwardly of the leading end 20 of the deflector board 18.

Also carried on the mounting plate 14 and in advance of the leading end 20 of the board 18 is a bolt or stud 21 on which a bell-crank lever L is hung to swing toward and from the leading end 20 of the board 18, this bell-crank lever L having an arm 22 extending toward the board 18 and an arm 23 depending downwardly toward the ground. To this depending arm 23 is secured, as by bolts 24, a plate 25 which carries a journal or axle stud 26 on which is rotatably mounted (Fig. 3) a ground engaging wheel 27 (shown dismounted from stud 26 in Fig. 2). It is at once apparent that when the cutter bar 12 and shoe 13 move forwardly over the ground the drag of the wheel 27 on the ground will cause the wheel 27 to lag back and swing the down lever 23 and the plate 25 of the bell crank lever L rearwardly on its pivot 21 and consequently swing the lever 22 of the bell crank lever upwardly; and conversely on backward movement of the cutter bar 12 and shoe 13 over the ground, the drag of the wheel 27 on the ground will cause the wheel 27 to lag in the opposite direction relatively to the cutter bar 12 and shoe 13 and will swing the arm 23 and the plate 25 of the bell crank lever forwardly relative to the cutter bar and shoe 13 and swing the arm 22 of the bell crank lever downwardly. Spaced stop lugs 28 and 29 are provided on the mounting plate 14 to limit the extent of swing of the bell crank lever arm 23, 25 in either direction.

A rod or bar 30 is secured to the back of the deflector board 18 as by means of bolts 31 and has an end 30' protruding forwardly of the leading edge 20 of the board 18; and this end of the bar 30 is connected, as by link 32, to the horizontal arm 22 of bell crank lever L. Thus when the bell crank lever L swings rearwardly its arm 22 rises and the deflector board 18 swings down about its pivot 17 by gravity and when the bell crank lever L swings forwardly the arm 22 of bell crank lever L lowers and swings the board 18 upwardly about its pivot 17. This lifting of the board 18 may be aided by a tension spring 33 hooked at its upper end to the lever arm 22 and at its lower end to the mounting plate 14 or shoe 13, and, if desired, be aided also by a spring 34 coiled about the pivot pin or bolt 17 of the board 18 and attached at one end to the bolt 17 or to the mounting plate 14 and at the other end to the board 18.

Preferably the arm 23 of the bell crank lever L is provided with a plurality of pairs of spaced holes, such as 35 (Fig. 3), which can be engaged selectively with the bolts 24 to permit vertical adjustment of the plate 25 on the arm 23 and consequently the height at which mounting plate 14 is carried above the ground. In other words, bearing in mind that wheel 27 engages the ground and supports the weight of the outer end of the mower, this adjustment makes it possible to vary the height of grass board 18 above the ground; moreover, the adjustment permitted by elongated slot 16 makes it possible to adjust the elevation of shoe 13 above the ground and hence the height of the outer end of the cutter bar 12.

In the modification shown in Fig. 5, the element which drags on the ground and effects the automatic raising and lowering of the grass deflector board 18 is a shoe or skid 36 fastened, for instance as by welding 36', to the lower end of the depending arm 23' of the bell crank lever L'. Also a different form of spring for aiding the raising of the deflector board 18 is shown, and is a wire or strip 37 of spring material making a center turn about the pivot bolt 17 and having one end 38 hooked under the board 18 and its other end 39 engaged under the stop lug 28' for the bell crank lever L'. Another variation is that the lug 29 shown in the other modification is omitted and the stop lug 28' is arranged to be contacted by and to stop the lever arm 22' of the bell crank lever L' when the lever is swung forwardly and to be contacted by and to stop the arm 23' of the lever when swung rearwardly.

Both embodiments may include a horizontal guard 40 carried on the shoe 13 to keep the operating mechanism clear of the grass through which the drag member 27 or 36 is moving, the mid-portion of this guard 40 being shown broken away in Fig. 2 to facilitate illustration of other parts.

To prepare for operation, the mounting plate 14 is adjusted to the desired height on the shoe 13 and the wheel 27 is adjusted to the desired height on the bell crank lever L so that the grass deflector board 18 when in its normal operating position will be at the desired height above the ground and the wheel 27 or skid 36 will make the desired degree or drag contact with the ground. Now, during the forward movement along a course, the drag wheel 27 or drag skid 36 by the drag force against the ground will keep the bell crank lever L (or L') in its rearward position against the stop lug 28 (or 28') and the deflector board 18 will be held in its lowered, normal operating position by gravity. When the mowing machine is made to turn to the right, the cutter bar 12 and its shoe 13 move rearwardly over the ground, for instance toward the positions indicated in dotted lines in Fig. 1. Upon such movement of the shoe 13 the drag resistance of the drag member 27 or 36 on the ground will cause the drag member to swing the bell crank lever L (or L') forwardly on the mounting plate 14 until, as in the modification of Fig. 2, the depending arm 23 of the bell crank lever is stopped by the lug 29, or, as in the modification of Fig. 5, the arm 22' of the bell crank lever is stopped in its downward swing by the top of stop lug 28'. As the bell crank lever swings in this direction the linkage between the lever and the deflector board causes the deflector board to swing upwardly about its pivot 17 and out of danger of being damaged or strained by contacting the ground or obstructions thereon. The board 18 remains elevated until the shoe 13 resumes forward motion over the ground, and at that time, due to the accompanying rearward swing of the bell crank lever, the board lowers automatically into normal operating position.

It is to be noted that the automatic board lifting and lowering mechanism of my invention in no way interferes with the raising of the cutter bar into the usual non-operating position as is customary when the mower is being driven to and from the field.

It is also apparent from the above that the mechanism is simple, sturdy and durable, comprising relatively few parts, all of which readily replaceable; which permits the height of the deflector board and the operating drag member from the ground to be variably adjusted easily; and which operates positively and effectively to automatically raise the deflector board on rearward movement of the cutter bar and its shoe over the ground and to lower the board automatically upon forward movement of the cutter bar and its shoe over the ground.

As many possible changes could be made in the above construction and as many different embodiments of this invention could be made without departing from the scope thereof, it is understood that all matter contained in the above description or shown in the accompanying drawings be interpreted as illustrative and not in a limiting sense.

Having thus described my invention, I claim:

1. Mechanism of the character described for raising and lowering a grass deflector board pivotally carried on the end of the cutter bar of a mowing machine, said mechanism including a drag member draggingly riding on the ground, and connections connecting said drag member and board permitting limited forward and rearward movement of said board relatively to said drag member and operating in response to such relative forward movement of said board to lower the board and in response to such relative rearward movement of the board to elevate the board, said connections including a bell crank lever having one arm connected to the drag member to move therewith and its other arm connected to the deflector board at a point spaced forwardly of the board's pivot point.

2. Mechanism of the character described for raising and lowering a grass deflector board pivotally carried on the end of the cutter bar of a mowing machine, said mechanism including a drag member draggingly riding on the ground, and connections connecting said drag member and board permitting limited forward and rearward movement of said board relatively to said drag member and operating in response to such relative forward movement of said board to lower the board and in response to such relative rearward movement of the board to elevate the board, said connections including a rod secured to the deflector board and extending forwardly of the leading end of the board, a bell crank lever having one arm connected to the drag member to move therewith and its other arm connected to said rod at a point forwardly of the leading end of the deflector board.

3. Mechanism of the character described for raising and lowering a grass deflector board pivotally carried on the end of the cutter bar of a mowing machine, said bar having an end shoe, said mechanism including a mounting plate adapted to be secured to the shoe of the mower, a bell crank lever pivoted on the mounting plate and having a depending arm and a second arm extending toward the leading edge of the deflector board from in front thereof, a drag member on the lower end of said depending lever arm and in position to drag on the ground and a link connection between said second lever arm and the deflector board at a point forwardly of the board's pivot point, and stop means engageable by said bell crank lever limiting the extent of swing of the lever in both directions.

4. Mechanism as set forth in claim 3 and which includes spring means connected to said bell crank lever and said mounting plate exerting pull on said lever to swing it to its most forward position on the mounting plate.

5. Mechanism as set forth in claim 3 and in which the mounting plate is vertically adjustable on the shoe of the mower.

6. Mechanism as set forth in claim 3 and in which the drag member is mounted on a plate and said plate is mounted on the depending arm of the bell crank lever and is vertically adjustable thereon.

7. Mechanism as set forth in claim 3 and in which the bell crank lever is vertically adjustable on the mounting place.

8. Mechanism as set forth in claim 3 and in which the stop means consists of a single stop lug on the mounting plate and in such position thereon relatively to the arms of the bell crank lever as to be engaged by the depending arm of the bell crank lever when the lever is swung in one direction to a certain position and to be engaged by the other arm of the bell crank lever when the lever is swung in the other direction to another certain position.

9. In a mowing machine of the type having a cutter bar and a grass deflector board pivotally carried on the end of the cutter bar for up and down swinging movement; the improvement which comprises a ground-engaging drag member movably mounted on the cutter bar for limited forward and rearward movement relative thereto, whereby said member tends to shift forwardly or rearwardly upon a reversal in the direction of travel of the cutter bar, and linkage interconnecting said drag member and said deflector board and operated by said shifting of the drag member to raise and lower the deflector board.

10. A machine as in claim 9 wherein said ground-engaging drag member is a skid.

11. In a mowing machine of the type having a cutter bar and a grass deflector board pivotally carried on the end of the cutter bar for up and down swinging movement; the improvement which comprises a ground-engaging wheel having an axle movably mounted on the cutter bar for limited forward and rearward movement relative thereto, whereby said axle tends to shift forwardly or rearwardly under the influence of said wheel upon a reversal in the direction of travel of the cutter bar, and linkage interconnecting said axle and said deflector board and operated by shifting of the axle to raise and lower the deflector board.

12. In a mowing machine of the type having a cutter bar with an end shoe and a grass deflector board pivoted on the shoe to swing up and down; the improvement which comprises mechanism for automatically swinging said board upwardly upon rearward travel of the shoe and swinging it downwardly upon forward travel of the shoe, said mechanism including a control member movably mounted on the shoe for limited forward and rearward movement relative thereto, said member having a ground-engaging drag element operative to shift said member forwardly or rearwardly depending upon the direction of travel of said shoe, and means controlled by the shifting of said member and operatively connected to said deflector board to produce a corresponding shift of the latter.

13. In a mowing machine of the type having a cutter bar with an end shoe and a grass deflector board pivotally mounted on the shoe to swing up and down; the improvement which comprises an arm pivoted to the shoe and carrying a ground-engaging drag member operative to swing said arm in one direction about its pivot upon forward travel of the shoe and swing it in the opposite direction about its pivot on rearward travel of the shoe, and linkage interconnecting said arm and said deflector board, said linkage operated by the arm for raising said deflector board upon swinging movement of said arm in said last direction and lowering the board upon swinging movement of the arm in said first direction.

14. A machine as in claim 13 having stop means limiting the swinging movement of said arm in each direction about its pivot.

15. A machine as in claim 13 wherein said ground-engaging drag member is adjustably mounted on said arm to permit adjustment of its position relative to the arm.

WALTER L. WEAKLEND.

REFERENCES CITED

The following references are of record in the file of this patent:

UNITED STATES PATENTS

| Number | Name | Date |
|---|---|---|
| 348 | Reily | Jan. 29, 1856 |
| 777,731 | McLeod | Dec. 20, 1904 |
| 919,119 | Blossom | Apr. 20, 1909 |
| 1,221,980 | Dorsey | Apr. 10, 1917 |